United States Patent [19]
Hugh

[11] Patent Number: 6,166,736
[45] Date of Patent: Dec. 26, 2000

[54] METHOD AND APPARATUS FOR SIMULTANEOUSLY RESIZING AND RELOCATING WINDOWS WITHIN A GRAPHICAL DISPLAY

[75] Inventor: Harlan M. Hugh, Los Angeles, Calif.

[73] Assignee: Natrificial LLC, Santa Monica, Calif.

[21] Appl. No.: 09/137,988

[22] Filed: Aug. 21, 1998

Related U.S. Application Data

[60] Provisional application No. 60/056,840, Aug. 27, 1997.

[51] Int. Cl.[7] ....................................... G06F 13/00
[52] U.S. Cl. ..................... 345/340; 345/352; 345/333
[58] Field of Search ................................ 345/333, 339, 345/342, 352, 340, 334, 346, 348, 349, 350, 351

[56] References Cited

U.S. PATENT DOCUMENTS

| | | | |
|---|---|---|---|
| 5,712,995 | 1/1998 | Cohn | 345/342 |
| 5,745,718 | 4/1998 | Cline et al. | 345/352 |
| 5,835,090 | 11/1998 | Clark et al. | 345/339 |
| 5,917,483 | 6/1999 | Duncan et al. | 345/333 |

FOREIGN PATENT DOCUMENTS

| | | | |
|---|---|---|---|
| 0 156 116 | 10/1985 | European Pat. Off. | G09F 1/00 |
| 0 499 129 | 8/1992 | European Pat. Off. | G06F 3/14 |
| 0 689 133 | 12/1995 | European Pat. Off. | G06F 9/44 |
| 0 841 609 | 5/1998 | European Pat. Off. | G06F 3/033 |

OTHER PUBLICATIONS

"Window Pull Out" IBM Technical Disclosure Bulletin, vol. 38, No. 8, Aug. 1, 1995, p. 245 XP000534502.

*Primary Examiner*—Raymond J. Bayerl
*Assistant Examiner*—Tadesse Hailu
*Attorney, Agent, or Firm*—Chien-Wei (Chris) Chou; Oppenheimer Wolff & Donnelly LLP

[57] ABSTRACT

An effective method for the display of a plurality of useful windows within the display of a digital information device. A form of tabbed window, called a "MetaView" permits users define the location and size of a window by a single interaction with a MetaView tab. The invention offers improved utilization of screen real estate, and increased user convenience in accessing multiple window displays.

8 Claims, 9 Drawing Sheets

METHOD AND APPARATUS FOR SIMULTANEOUSLY RESIZING AND RELOCATING WINDOWS WITHIN A GRAPHICAL DISPLAY

This application claims priority to U.S. Provisional Application Ser. No. 60/056,840 filed on Aug. 27, 1997.

FIELD OF THE INVENTION

This invention relates to methods and apparatus for organizing and processing information, and more particularly, to computer-based graphical user interface-driven methods minimizing the input steps users must take to simultaneously and conveniently reposition and resize frames of output within a digital computer's graphic display.

BACKGROUND

Windows have become the central element of the now ubiquitous graphical interfaces dominating virtually every user's computer experience. Based on a paper metaphor, they permit users intuitively to switch amongst active computer programs, documents and tasks. Yet every user is familiar with the limitations of prior windows interfaces stemming from the confusion which often results from having too many windows open within the limited display space of computer monitors, and the constant resizing and repositioning required to organize the display of multiple windows. It is a purpose of the present invention to offer an improved method of displaying windows that frees the user from such confusion, and minimize the number of user interactions required to organize a computer display.

Users often have more than one window open at a time. Each window can be moved and resized. They can also be placed on top of one another. This makes windows extremely useful since they allow programs and users to organize everything on the screen visually. The repositioning and resizing of windows allows users to give prominence to active computer files, while leaving inactive files accessible.

Figure 1:
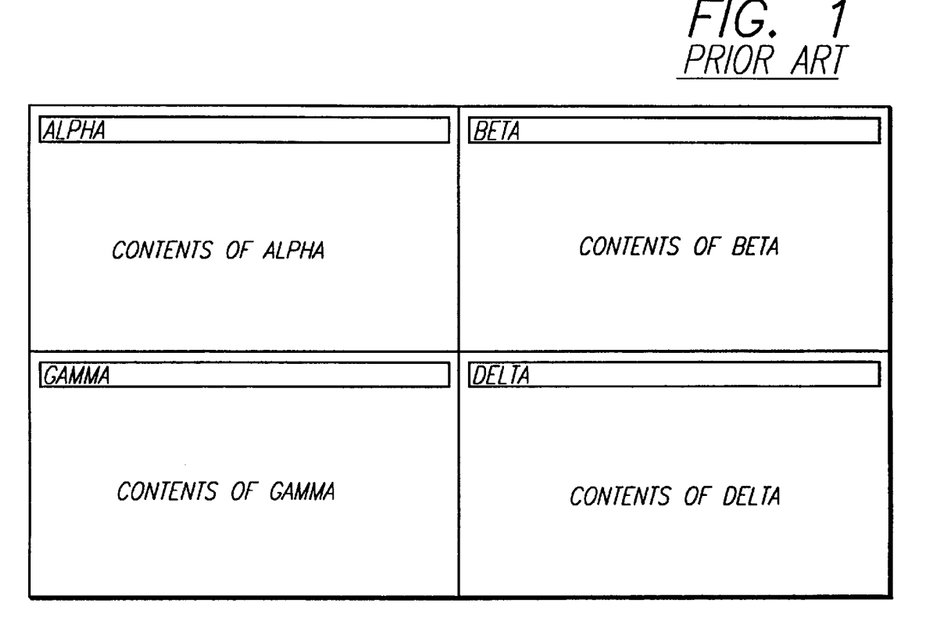
FIG. 1 illustrates a prior art tiled window.

Windows are a useful metaphor permitting users simultaneous access to several computer documents or functions. However, multiple window schemes of the prior art suffer from certain well-known limitations. Namely, the utility of the prior art windowing are wasteful of the limited display space ("screen real estate") available within a computer's display, and fail to enable users adequately to switch amongst the contents of multiple windows. Specifically, in the prior art, windows are lost when other windows cover them up. The user has no convenient way of knowing that a window is "under" another window. Functions for the automatic arrangement of windows such as tiling (FIG. 1) and cascading (FIG. 2) waste screen real estate. As at least one commentator has noted, "Leaving an edge of one application's rectangle peeking out from behind the active window is an egregious waste of precious pixels." (ALAN COOPER, ABOUT FACE 70 (August 1995)). When multiple windows need to be fully accessed, screen space is between them is wasted unless the user takes the time and effort to resize them manually. And lastly, the prior art offers the user no convenient method of switching quickly amongst multiple windows.

For the purposes of explaining the advantages of the present invention, we now offer a more detailed description of the shortcomings of prior art windowing systems. In the prior art, various attempts have been made to address individual aspects of the multiple window management and screen real estate, but none offers a single straightforward solution.

Figure 2:
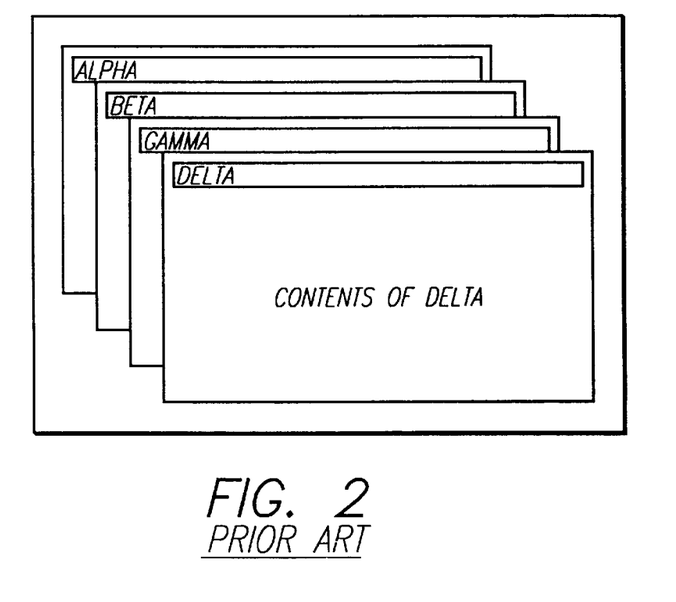
FIG. 2 illustrates a prior art cascading window.

Window Arrangement Commands. The prior art offers users various automatic window location and sizing options to clean up windows into specific, predefined arrangements, such as the common tiling arrangements (FIG. 1) and cascading arrangements of the prior art (FIG. 2). Tiled windows are automatically laid out so that the edges of windows abut each other and screen space is divided up. This method solves the problem of lost windows, at the expense of functional room within the tiled windows, and screen real estate. No more than a few windows can be evenly tiled before none are accorded enough screen space to be useful. Cascading commands (FIG. 2) permit users to find a window that was lost and uniformly arrange windows, but they require users to reposition and resize all of their windows in order to find just one, and waste screen real estate by including non-useful edges of windows within the display.

Figure 3:
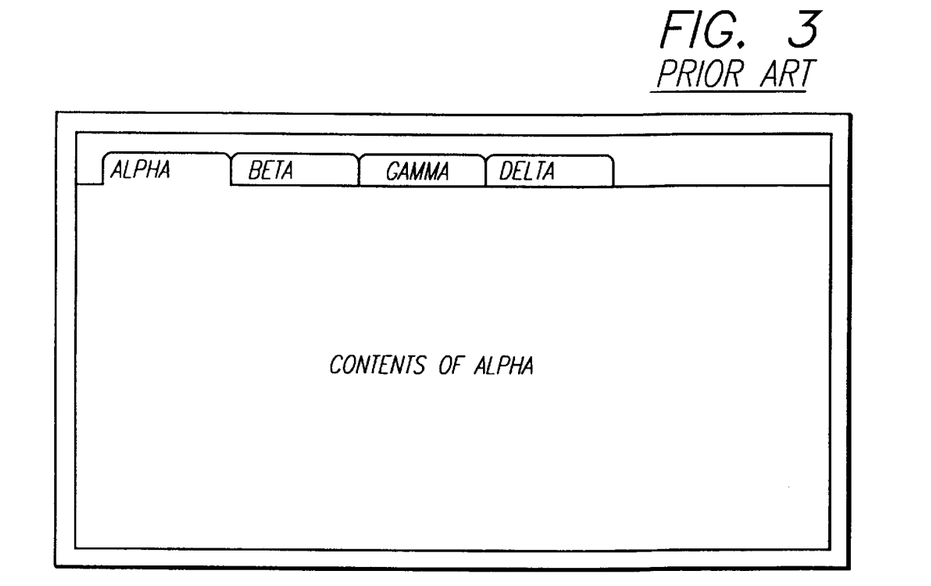
FIG. 3 illustrates a prior art tabbed window.

Tabbed Windows. In their basic form, tabbed windows enable users to switch amongst multiple windows quickly (FIG. 3). However, only one of the tabbed windows can be displayed at a time. An extended implementation of tabbed windows implemented in computer programs such as PhotoShop™ by Adobe, allows the tabs to be dragged out of the containing window and expand into the window corresponding to the tab. But this just leads to the same problems inherent in any overlapping windows scheme.

Figure 4:
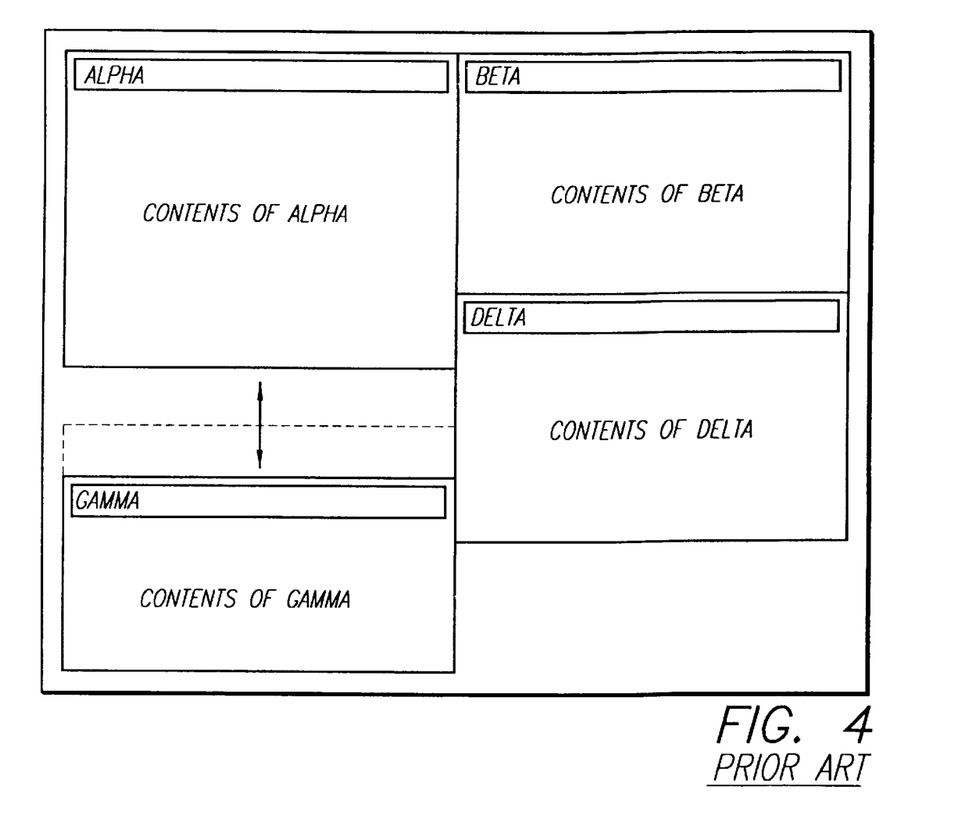
FIG. 4 illustrates a prior art magnetic window.

Magnetic Windows. Magnetic windows address the problem of wasted screen space between fully displayed windows. When the edge of one window is dragged close to another, the window being moved "snaps" to the edge of the stationary window (FIG. 4). This is useful if the windows are not already next to each other, but fails when windows that are next to each other need to be resized. Magnetic windows can be seen in several programs such as Adobe PhotoShop 4.0.

Figure 5:
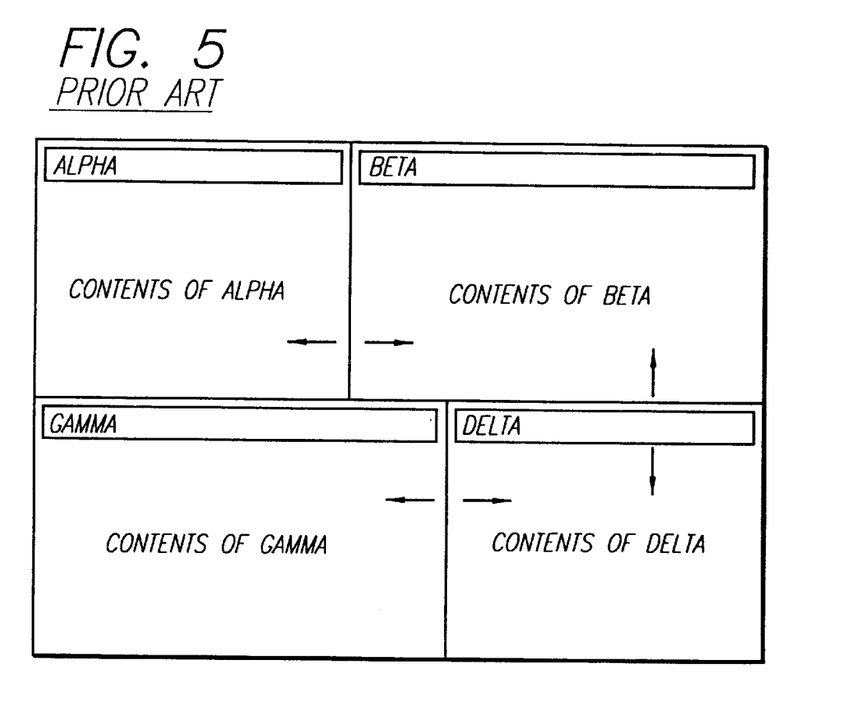
FIG. 5 illustrates a prior art splitter window.

Splitter Windows. Splitter windows allow two windows to be resized at once by assigning them to a mutual edge (FIG. 5). This works well so long as the number of windows remains low and the windows do not need to be relocated. Docking windows, a variant upon splitter windows, can be detached to become like a regular window and then later re-attached. All of these schemes require separate user steps to size and position separate windows, and do not adequately function to conserve screen real estate.

Figure 6:
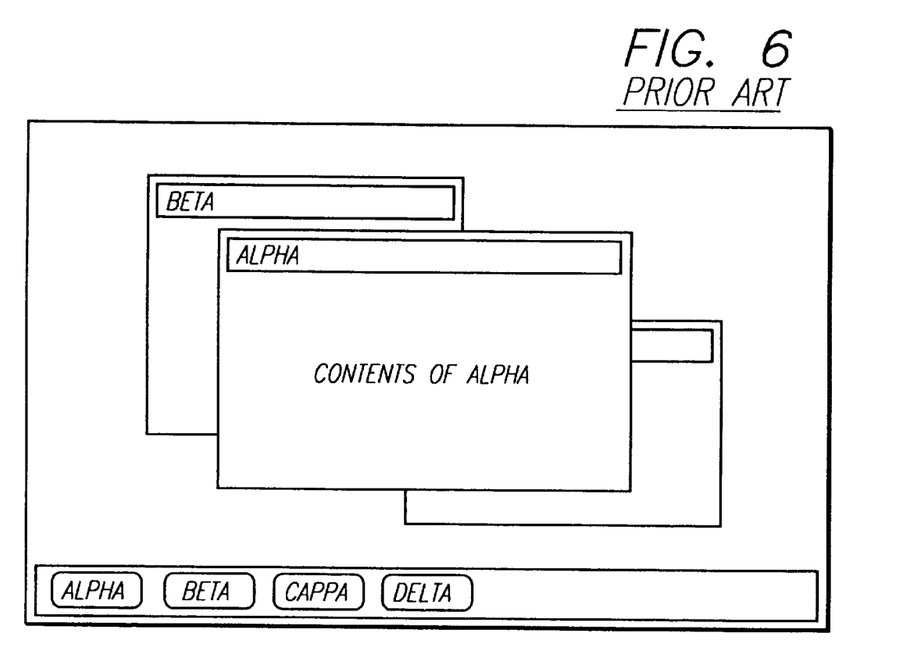
FIG. 6 illustrates a prior art task bar.

Task Bars. Task bars, such as the Start bar in Microsoft's Windows™ 95 interface, and other window switching commands and menus list all the open windows and allow the user to activate one by clicking on it (FIG. 6). This solves the problem of losing windows, but dose not assist users wishing to view the full contents of multiple windows simultaneously.

BRIEF SUMMARY OF INVENTION

An effective method for the display of a plurality of useful windows within the display of a digital information device is disclosed. A form of tabbed window, called a "MetaView" permits users to define the location and size of a window by a single interaction with a MetaView tab. The invention offers improved utilization of screen real estate, and increased user convenience in accessing multiple window displays.

NOTATION AND NOMENCLATURE

The detailed descriptions which follow are presented largely in terms of display images, algorithms, and symbolic representations of operations of data bits within a computer memory. These algorithmic descriptions and representations are the means used by those skilled in the data processing arts to most effectively convey the substance of their work to others skilled in the art.

An algorithm is here, and generally, conceived to be a self consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, images, terms, numbers, or the like. It should be borne in mind, however, that all of these and similar terms are to be associated with the appropriate physical quantities and are merely convenient labels applied to these quantities.

In the present case, the operations are machine operations performed in conjunction with a human operator. Useful machines for performing the operations of the present invention include general purpose digital computers or other similar devices. In all cases, there should be borne in mind the distinction between the method operations of operating a computer and the method of computation itself. The present invention relates to method steps for operating a computer and processing electrical or other physical signals to generate other desired physical signals.

The present invention also relates to apparatus for performing these operations. This apparatus may be specially constructed for the required purposes, or it may comprise a general purpose computer selectively activated or reconfigured by a computer program stored in the computer. The algorithms, methods and apparatus presented herein are not inherently related to any particular computer. In particular, various general purpose machines may be used with programs in accordance with the teachings herein, or it may prove more convenient to construct more specialized apparatus to perform the required method steps. The required structure for a variety of these machines will appear from the description given below.

DETAILED DESCRIPTION OF THE INVENTION

General System Architecture

Figure 7:
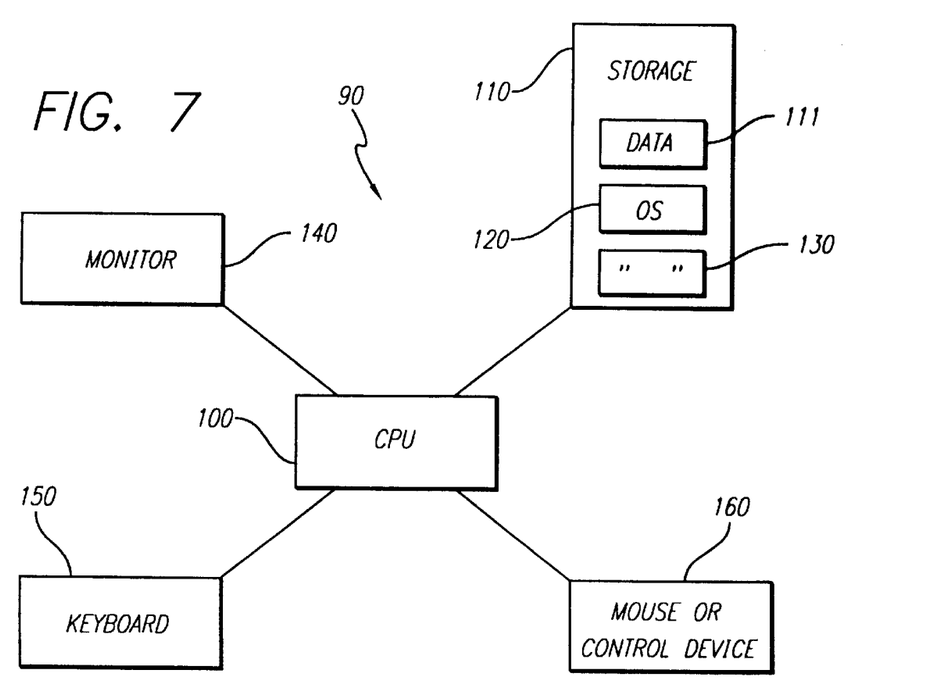
FIG. 7 illustrates the basic architecture of a computer system for use in implementing one embodiment of the present invention.

FIG. 7 depicts the general architecture of a digital computer system 90 for practicing the present invention. Processor 100 is a standard digital computer microprocessor, such as a CPU of the Intel x86 series. Processor 100 runs system software 120 (such as Microsoft Windows®, Mac OS® or another graphical operating system for personal computers), which is stored on storage unit 110, e.g., a standard internal fixed disk drive. In accordance with the GUI of the present invention, the "MetaView" software 130, also stored on storage unit 110, includes computer program code for performing the tasks and steps described below, including the digital representation of the contents, locations and dimensions of MetaView tabs and windows, the display of those items, and the processing of such user manipulation of those items in accordance with the principles of the present invention. Display output, including the visual graphical user interface ("GUI") discussed below, is transmitted from processor 100 to an output device such as a video monitor 140 for display to users. Users utilize input devices such as standard personal computer keyboard 150, cursor control device 160 (e.g., a mouse or trackball), touch-screen sensors on the monitor display, virtual reality gloves, voice input, or similar techniques to enter the GUI input commands discussed below, which are then transmitted to processor 100. Software for implementing MetaView may be stored in a variety of locations and in a variety of mediums, including without limitation, RAM, data storage 111, a network server, a fixed or portable hard disk drive, an optical disk, or a floppy disk.

Defining a MetaView

Figure 8:
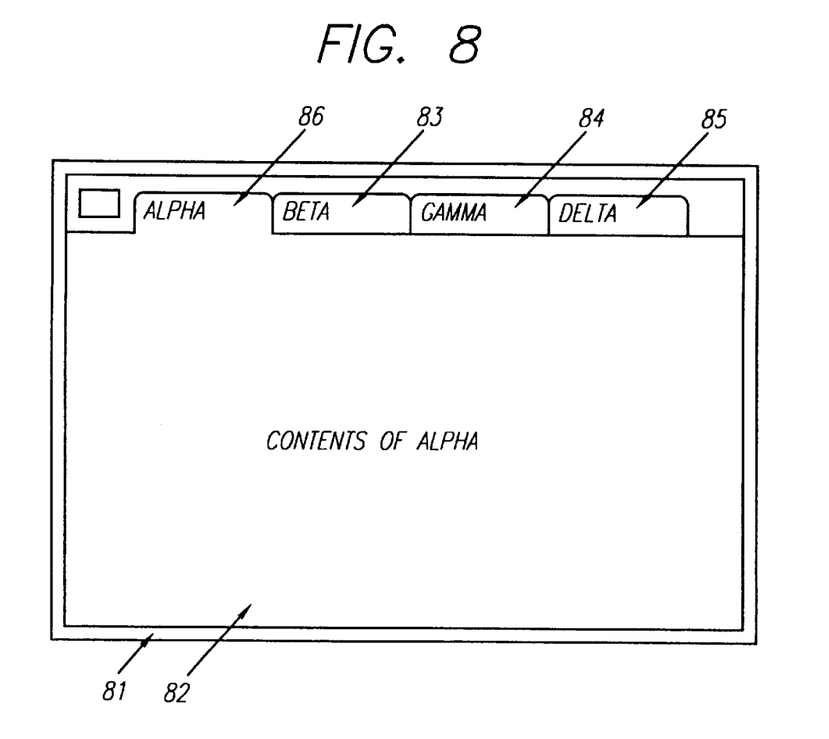
FIG. 8 illustrates a MetaView in accordance with the present invention.

The graphical container of a plurality of windows and tabs corresponding to windows described herein is referred to as a "MetaView." In its simplest embodiment, the present invention functions as a single window, bearing a plurality of tabs, corresponding to a plurality of window displays which would result from a user interactively selecting those tabs. For example within the MetaView 81 shown in FIG. 8, a user has interactively selected the Alpha tab 86, and thus the Alpha window 82 subsumes the entire MetaView, obscuring the contents of windows Beta, Gamma and Delta, but leaving Beta 83, Gamma 84, and Delta 85 tabs corresponding to those windows visible. In the same manner, a user interactively selecting the Beta 83 tab would result in the contents of a Beta window to come to the top, obscuring the contents of Alpha, Gamma and Delta, leaving only the tabs Alpha 86, Gamma 84 and Delta 85 visible.

Expanding a Pane Within a MetaView

Figure 9:
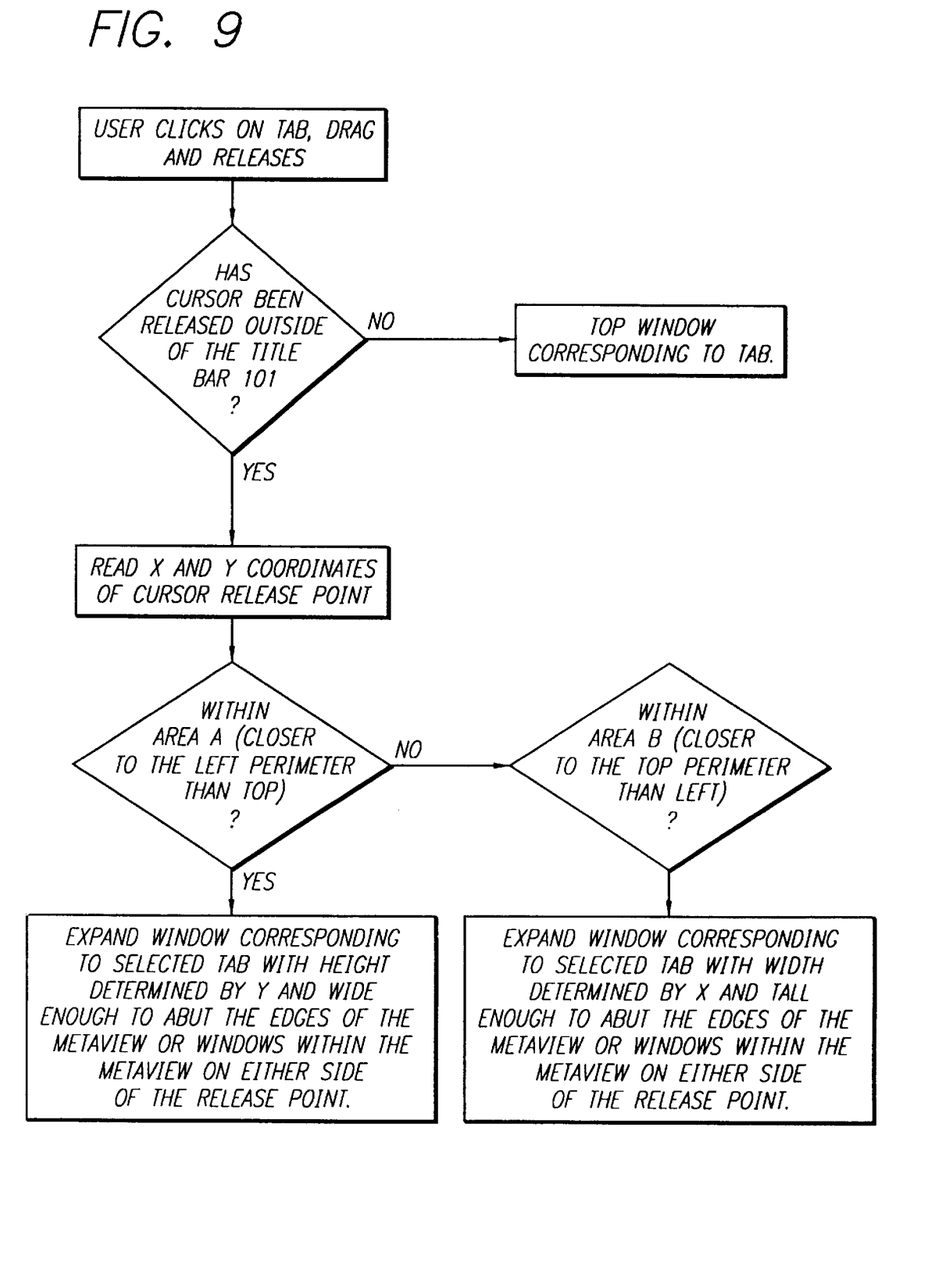
FIG. 9 illustrates a flow diagram for simultaneously sizing and locating windows in response to a single user interactive step under the present invention.
Figure 10:
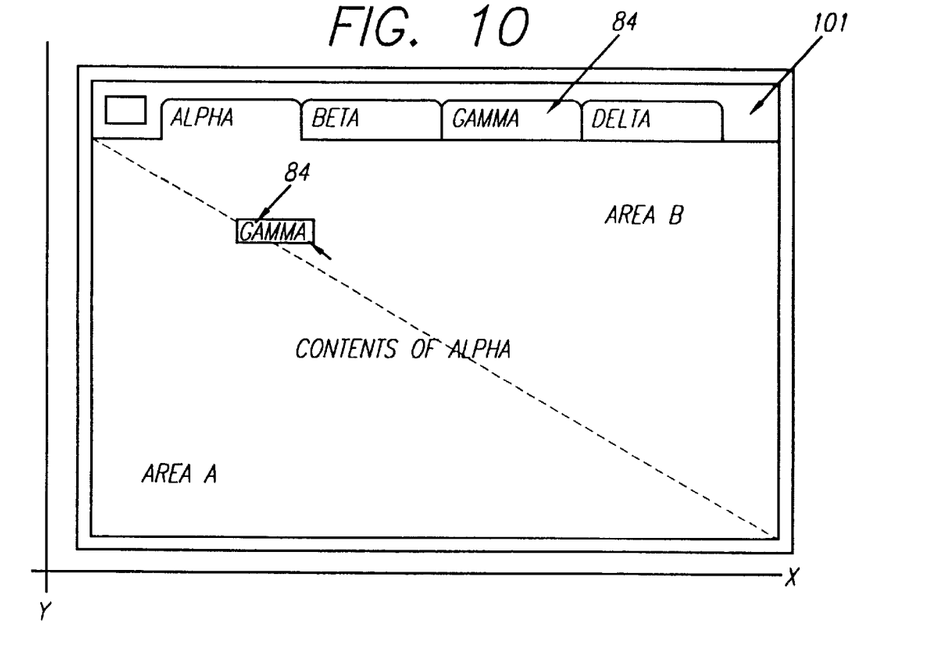
FIG. 10 illustrates a MetaView during a user interaction, and the screen "areas" utilized under the present invention.
Figure 11:
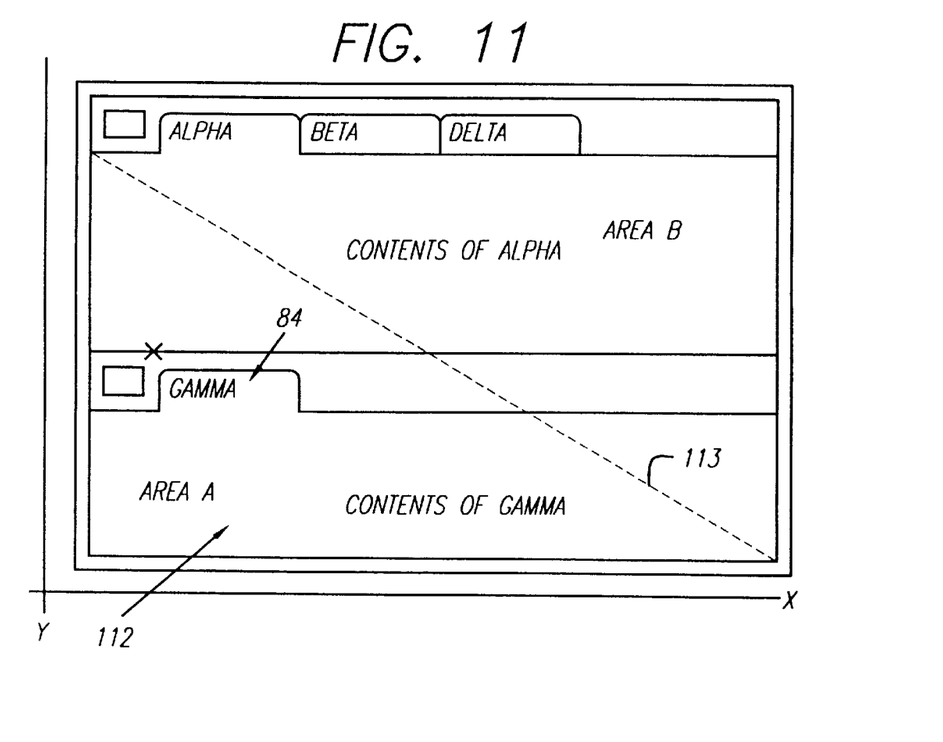
FIG. 11 illustrates a MetaView resulting from a user interaction.
Figure 12:
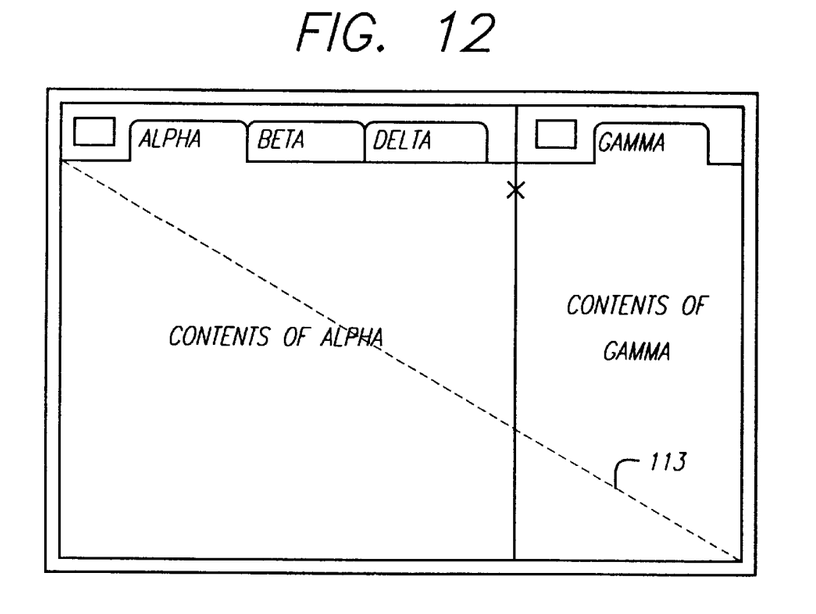
FIG. 12 illustrates a MetaView resulting from a user.

Unlike a tabbed window, a MetaView enables a user to resize and relocate full windows corresponding to the tab, with a single user interaction. Using a single command, a user can define the size and location of a window. In order to size and locate a full window corresponding to the tab Gamma 84, a user interactively selects Gamma using cursor control device 160, drags Gamma 84 out of the title bar, (See, FIG. 10) and releases, (See, FIG. 11.) In this FIG. 10, if the cursor is released towards the left of the existing window (Area A which is below or to the left of the imaginary diagonal 113, for example), the area will be split horizontally (See, FIG. 11). If it is dropped closer to the top of the existing window (Area B 114 which is above or to the right of the imaginary diagonal 113, for example), the area will be split vertically (See FIG. 12). FIG. 9 discloses a flow chart corresponding to one implementation permitting users to resize and relocate windows within a MetaView in which tabs are arranged on the top left.

Figure 14:
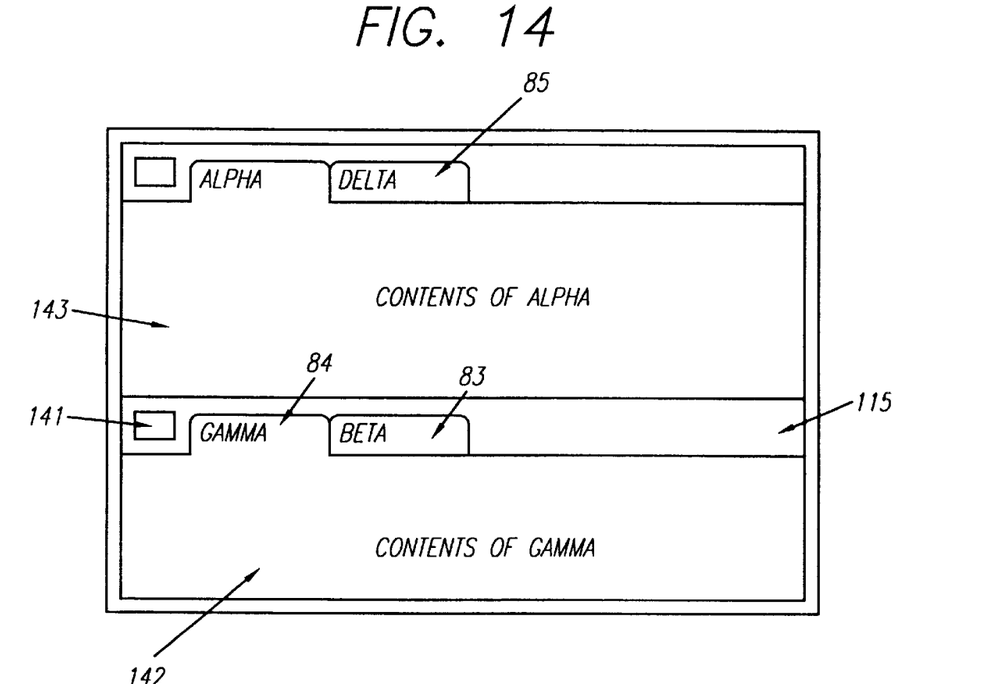
FIG. 14 illustrates a MetaView following an additional user interaction moving an additional tab to the new pane.
Figure 15:
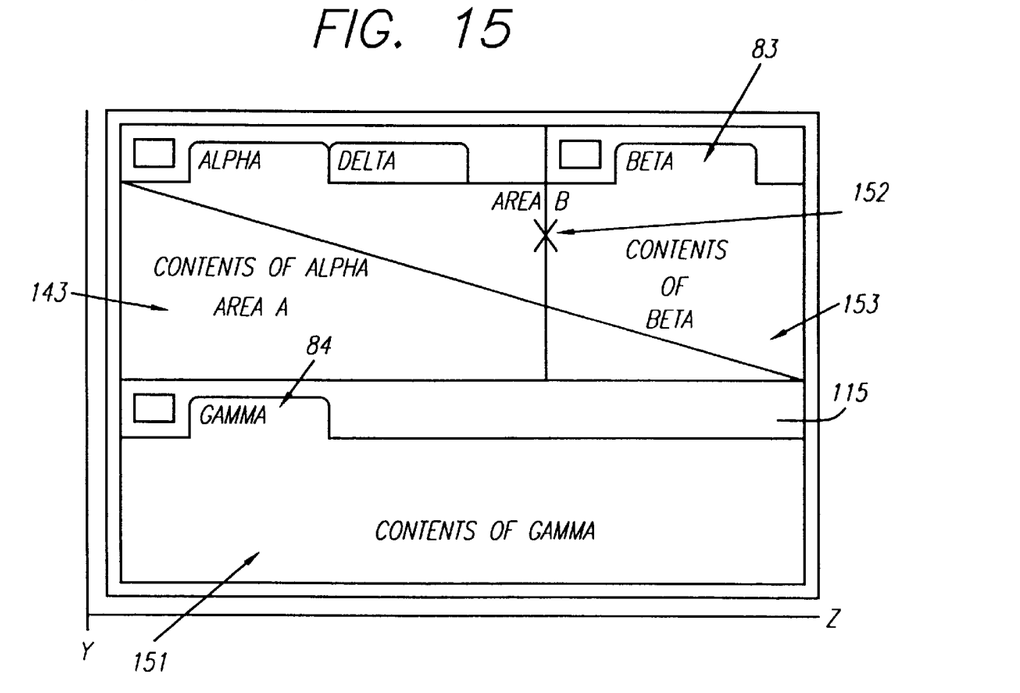
FIG. 15 illustrates a MetaView following an additional user interaction making that tab its own pane.

For the purposes of this discussion, a pane is a MetaView window with a single title bar, containing one or more tabs. In some embodiments of the present invention, each pane, such as the one consisting of window Alpha 82 and tab Delta 85, and another consisting of window Gamma 112 and tab Beta 83 behaves like a tabbed window (FIGS. 14 and 15). In addition, for the purposes of determining the size and location of additional windows or panes, some panes will bifurcate themselves into Area A and Area B, for the purposes of determining location and size according to the flow chart of FIG. 9.

Figure 13:
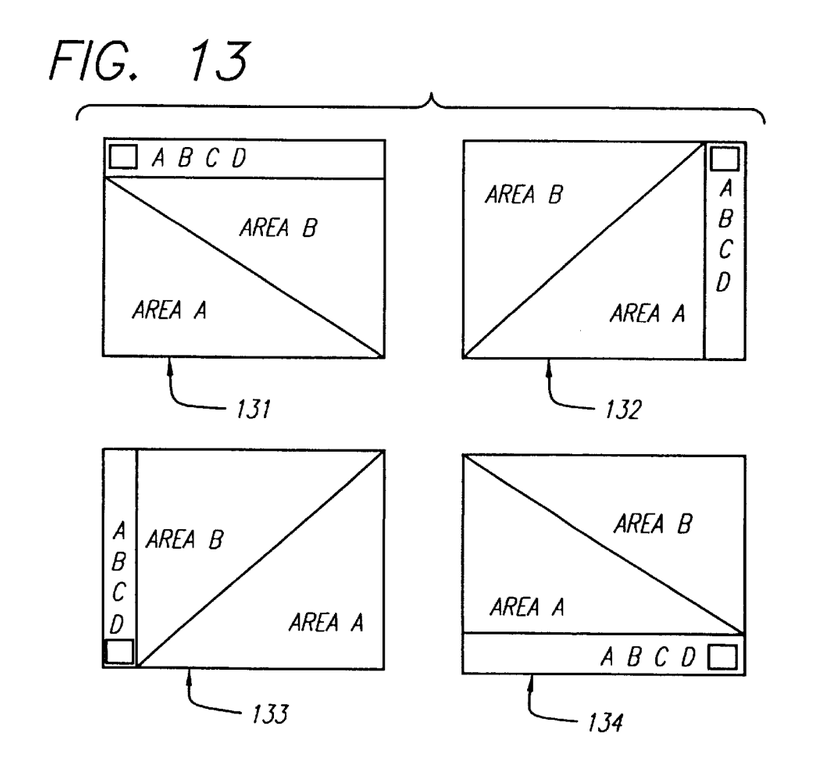
FIG. 13 illustrates four possible arrangements of screen "areas" based upon four possible locations of indicia within a MetaView.

FIG. 13 illustrates several possible arrangements 131–134 of the screen "areas" based upon different locations of indicia within a Metaview. The size and location to which tabs or windows may be expanded depends on whether tabs are displayed above or below windows. As FIG. 13 illustrates, releasing the cursor in Area A will result in a horizontally oriented window within MetaView 131 or 132, and in MetaView 132, the tab corresponding to the manipulated window will share the title bar with the other tabs. Releasing the cursor in Area A will result in a vertically oriented window within MetaView 133 or 134, and in MetaView 134, the tab corresponding to the manipulated win dow will share the title bar with the other tabs .

Common Panes

Additional tabs can now be dragged to the newly created pane, by releasing the cursor within the new title bar (FIG. 14) or additional windows can be created by releasing t he cursor within neither title bar (FIG. 15). In the MetaView illustrated by FIG. 14, Beta 83 has been interactively selected by a user, dragged and released anywhere within title bar 115. As a result, tab beta 83 is added to pane Gamma 142. In another embodiment, rather than dropping a tab onto the title bar, a user releases a tab onto another tab to result in a single pane with multiple tabs. In that embodiment, multiple panes result from releasing a moved tab anywhere except on top of another tab.

Still more panes result from releasing a moved tab in a location that will not add it to another existing title bar. As shown in FIGS. 14 and 15, if the user, by means of control device 160, drags tab Beta 83 (See, FIG. 14) to location 152 (See, FIG. 15) and releases, a new pane 153 will be created, whose width is determined by its x coordinate, and whose depth is determined by the perimeter of the MetaView on top, and by the top of window Gamma 151 on the bottom.

Manipulating Existing Panes

Figure 16:
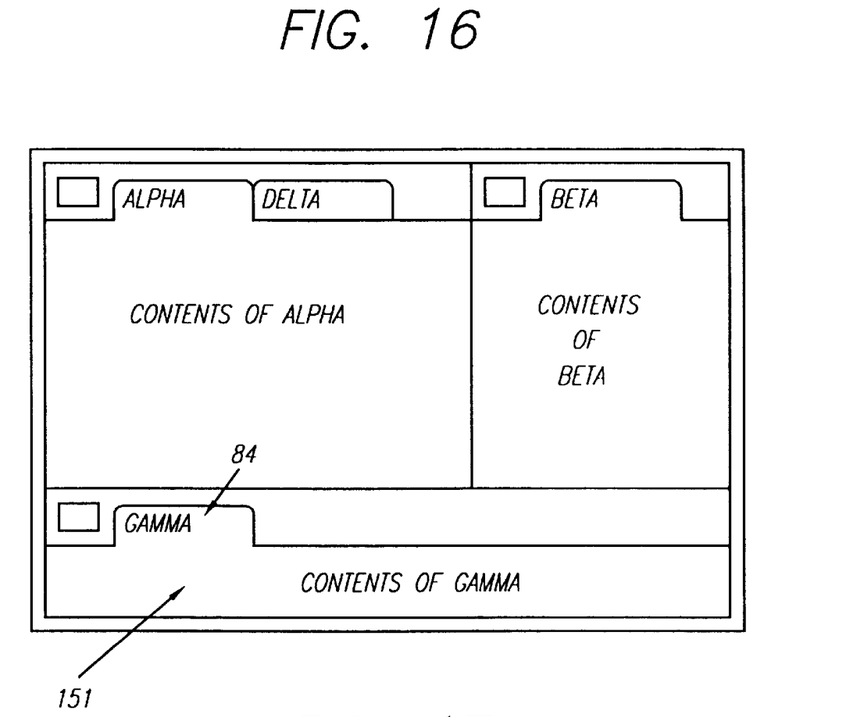
FIG. 16 illustrates a MetaView following an additional user interaction resizing an existing pane.

Dragging and dropping titles can also be used to resize or relocate existing panes in the same manner as creating a window described above. If there is only one title in a pane, the pane can be resized or located by selecting the tab itself using cursor control 160, dragging the tab to the desired location, and releasing. For example, FIGS. 15 and 16 illustrate how a user can resize Gamma window 151 by using cursor control device 160 to select pane Gamma 84, drag it to a location lower in the MetaView, and release. The result is a shorter pane Gamma 151 as seen in FIG. 16.

Manipulating Multiple Items Simultaneously

Figure 17:
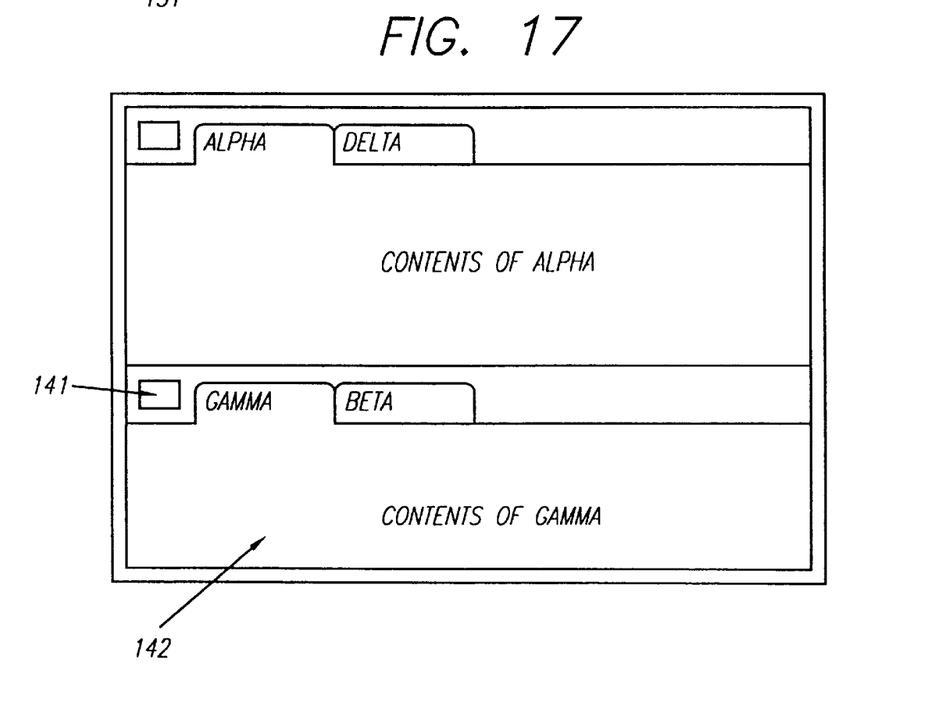
FIG. 17 illustrates a MetaView following an additional user interaction resizing an existing pane as shown in FIG. 14.

Certain embodiments enable the resizing and relocating of panes containing multiple tabs, by implementing a common control indicium 141 (See, FIG. 14) For example, a user can resize tabbed pane 142 by using cursor control device 160 to select the common control indicium 141, drag it to a location lower in the MetaView and release. The result is a shorter tabbed pane 142 as seen in FIG. 17.

Once again, in a MetaView structure displaying tabs on the top left or bottom right, if the common control is dropped closer to the left side of the pane in which it is contained than the top, then the split is horizontal. If the title is dropped closer to the top side of the pane in which it is contained than the left, then the split is vertical.

Maximize

It is possible to extend the MetaView system to include facilities for showing only one window at a time, much like the "maximize" and "restore" commands found in Microsoft Windows. With such a facility, the user can double click on a title or click a control to make the window cover the MetaView. In some embodiments, tabbing or task bar means could be employed to inform users of other available items while one MetaView window is maximized. In this maximizing embodiment, a distinct user command, such as a double click of control device 160 returns the MetaView to its previous state.

OTHER VARIATIONS

Detailed illustrations of an improved scheme of presenting graphical information within computer displays in accordance with the present invention have been provided above for the edification of those of ordinary skill in the art, and not as a limitation on the scope of the invention. Numerous variations and modifications within the spirit of the present invention will of course occur to those of ordinary skill in the art in view of the embodiments that have now been disclosed. For example, while in the described embodiment, the present invention is implemented for a GUI for general purpose computers, the present invention may also be effectively implemented for any information capable of the display of graphics. The scope of the inventions should, therefore, be determined not with reference to the above description, but should instead be determined with reference to the appended claims, along with the full scope of equivalents to which such claims are entitled.

I claim:

1. A system for implementing a window frame having a first viewable area for displaying the contents of any one of a plurality of windows and a second viewable area for displaying indicia of each such window, the system comprising:

(a) a window display mechanism that, in response to a first user interaction with the indicia of a first window of the plurality of windows, displays the contents of that first window in the first viewable area; and (b) a window frame split mechanism that, in response to a second user interaction with the indicia of a second window of the plurality of windows, splits the window frame into: a first window subframe having a third viewable area for displaying the contents of the second window and a fourth viewable area for displaying the indicia of that second window; and (ii) a second window subframe having the first viewable area for displaying the contents of any one of the plurality of windows other than the second window and the second viewable area for displaying indicia of each such window.

2. The system of claim 1 wherein the window frame split mechanism determines the relative orientation of the first window subframe and the second window subframe based on location information obtained during the second user interaction.

3. The system of claim 1 wherein the window frame split mechanism determines the relative size of the first window subframe and the second window subframe based on location information obtained during the second user interaction.

4. The system of claim 1 wherein the window frame split mechanism determines the location of the first window subframe and the second window subframe based on location information obtained during the second user interaction.

5. A method for implementing a window frame having a first viewable area for displaying the contents of any one of a plurality of windows and a second viewable area for displaying indicia of each such window, the method comprising the following steps:

(a) in response to a first user interaction with the indicia of a first window of the plurality of windows, displaying the contents of that first window in the first viewable area; and (b) in response to a second user interaction with the indicia of a second window of the plurality of windows, splitting the window frame into:

(i) a first window subframe having a third viewable area for displaying the contents of the second window and a fourth viewable area for displaying the indicia of that second window; and (ii) a second window subframe having the first viewable area for displaying the contents of any one of the plurality of windows other than the second window and the second viewable area for displaying indicia of each such window.

6. The method of claim 5 wherein the relative orientation of the first window subframe and the second window subframe is determined based on location information obtained during the second user interaction.

7. The method of claim 5 wherein the relative size of the first window subframe and the second window subframe is determined based on location information obtained during the second user interaction.

8. The method of claim 5 wherein the location of the first window subframe and the second window subframe is determined based on location information obtained during the second user interaction.

* * * * *